United States Patent [19]
Takato et al.

[11] Patent Number: 5,491,528
[45] Date of Patent: Feb. 13, 1996

[54] REAL IMAGE MODE FINDER OPTICAL SYSTEM HAVING AN OBJECTIVE LENS INTEGRATED AS A PRISM WITH A REFLECTIVE SURFACE

[75] Inventors: Hideyasu Takato; Seiji Shimizu, both of Hachioji, Japan

[73] Assignee: Olympus Optical Co., Ltd., Tokyo, Japan

[21] Appl. No.: 226,850

[22] Filed: Apr. 13, 1994

[30] Foreign Application Priority Data

Apr. 14, 1993 [JP] Japan .................... 5-087503

[51] Int. Cl.⁶ .................... G03B 13/08
[52] U.S. Cl. .................... 354/225; 354/224; 359/726; 359/835
[58] Field of Search .................... 354/219, 224, 354/225, 222, 166; 359/726, 793, 794, 834, 835

[56] References Cited

U.S. PATENT DOCUMENTS

| | | | |
|---|---|---|---|
| 5,034,763 | 7/1991 | Inabata | 354/219 |
| 5,144,349 | 9/1992 | Kato et al. | 354/222 |
| 5,206,675 | 4/1993 | Miyauchi et al. | 354/219 |
| 5,231,534 | 7/1993 | Kato | 359/432 |

FOREIGN PATENT DOCUMENTS

| | | |
|---|---|---|
| 61-156018 | 7/1986 | Japan . |
| 63-044616 | 2/1988 | Japan . |
| 63-226616 | 9/1988 | Japan . |
| 1-255825 | 10/1989 | Japan . |
| 2-309330 | 12/1990 | Japan . |
| 4-019705 | 1/1992 | Japan . |

*Primary Examiner*—David C. Nelms
*Assistant Examiner*—Andrew Q. Tran
*Attorney, Agent, or Firm*—Cushman, Darby & Cushman

[57] ABSTRACT

A real image mode finder optical system includes an objective lens, an image inverting optical member for erecting an object image formed by the objective lens, and an eyepiece for observing the object image. The objective lens has a reflecting surface and satisfies a condition:

$$0.1 < D/f < 0.4$$

where D is the distance between the exit surface of the objective lens and the entrance surface of the image inverting optical member and f is the focal length of the objective lens. Thus, the real image mode finder optical system are constructed with a small number of parts and compact design.

6 Claims, 5 Drawing Sheets

FIG. 4
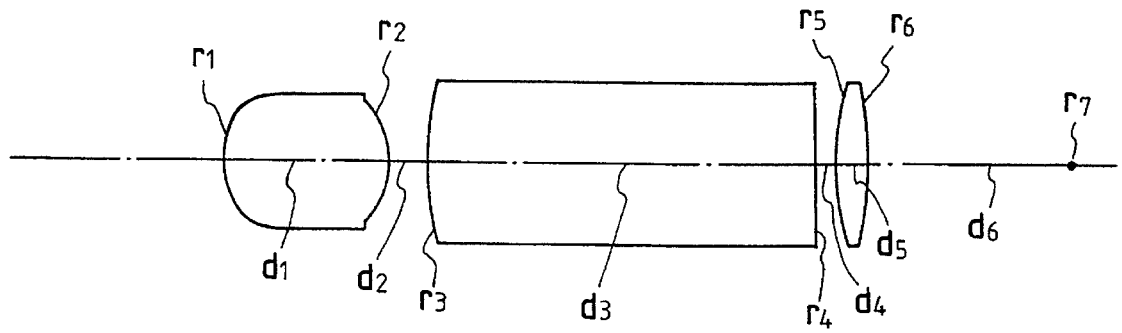
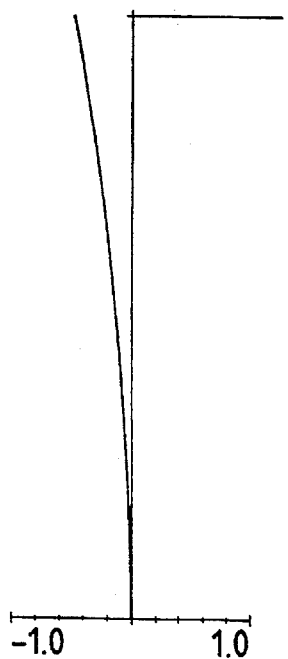
FIG. 5A
SPHERICAL ABERRATION
PUPIL DIAMETER = 2.0 mm
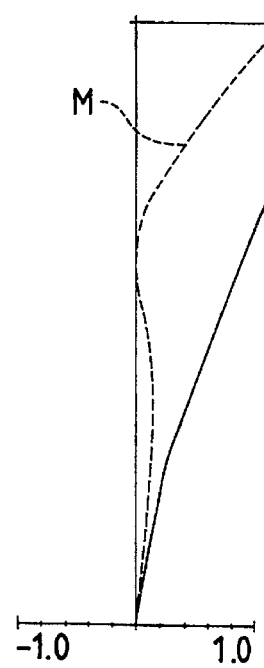
FIG. 5B
ASTIGMATISM
$\omega = 30.2°$
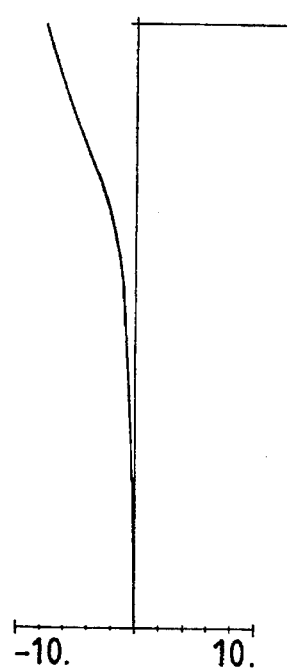
FIG. 5C
DISTORTION
$\omega = 30.2°$ SPHERICAL ABERRATION
PUPIL DIAMETER = 2.0 mm ASTIGMATISM
$\omega = 27.4°$ DISTORTION
$\omega = 27.4°$

FIG. 8
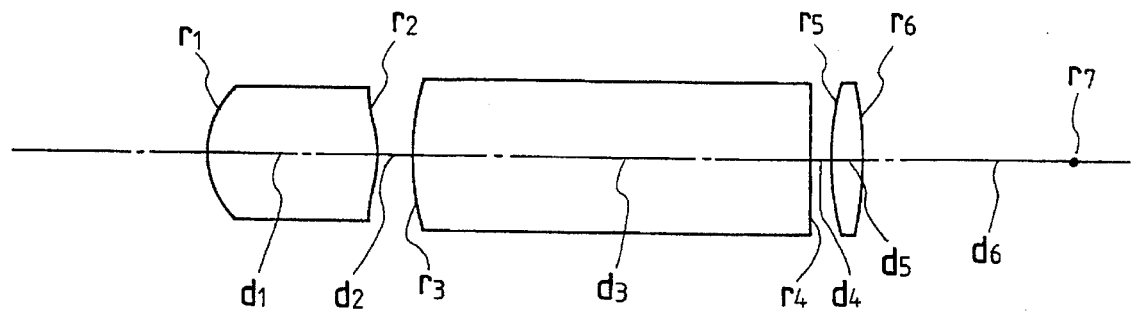
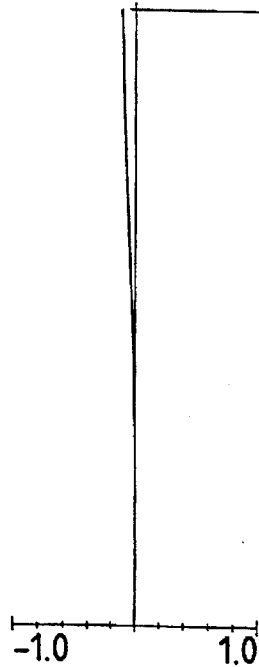
FIG. 9A
SPHERICAL ABERRATION
PUPIL DIAMETER = 2.0 mm
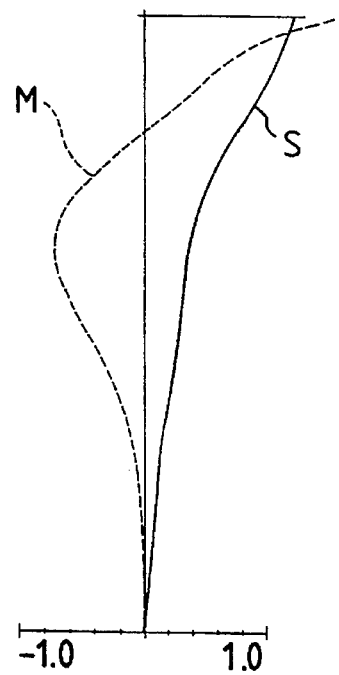
FIG. 9B
ASTIGMATISM
$\omega = 28.1°$
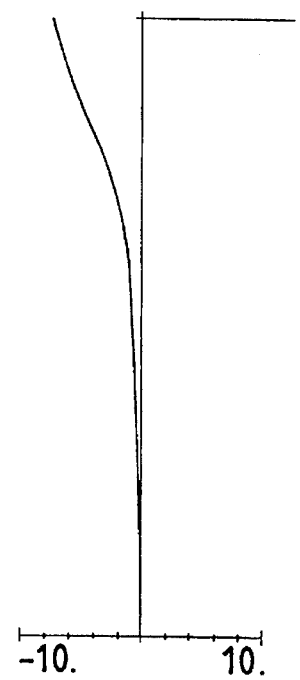
FIG. 9C
DISTORTION
$\omega = 28.1°$

REAL IMAGE MODE FINDER OPTICAL SYSTEM HAVING AN OBJECTIVE LENS INTEGRATED AS A PRISM WITH A REFLECTIVE SURFACE

BACKGROUND OF THE INVENTION

1. Field of the Invention

This invention relates to a real image mode finder optical system which is suitable for compact cameras such as photographic cameras and video cameras.

2. Description of the Related Art

In general, finder optical systems are available in virtual image modes, such as Albada and inverse Galilean types, and real image modes, such as Keplerjan types. The finder optical systems of conventional compact cameras has found many uses for virtual image modes. It is for this reason that the virtual image mode finder optical system brings about a wide field angle with comparative ease, has a smaller number of parts because it dispenses with an image erecting means, and allows its length along the optical axis to be reduced. Recently, on the other hand, the real image mode finder optical system has undergone many improvements such that an indicating member, like a field frame, is made easy to see, the effective diameters of lenses can be reduced, and an image inverting optical member, like a Porro prism, can be integrally molded of plastic. Consequently, real image mode finder optical systems (such as those set forth, for example, in Japanese Patent Preliminary Publication Nos. Sho 63-44616 and Sho 61-156018) have come into prominent use.

With the conventional real image mode finder optical systems as mentioned above, however, when an attempt is made to secure a relatively wide field angle, the height of an object image formed by an objective system will inevitably increase. Thus, for compactness of the optical system, the refracting power of the objective system need be increased. This causes the degradation of aberration. Hence, in order to improve the performance of the optical system, it is indispensable to increase the number of lenses of the objective system and lessen the refracting power of each lens. As a consequence of this, the problem is raised that the number of parts used in the optical system increases and its arrangement is complicated. Moreover, the position of the object image formed by the objective system is located in front of the image inverting optical member, and an eyepiece is located behind it.

FIG. 1 show the arrangement of the conventional real image mode finder optical system. This optical system includes an objective lens having lens surfaces $R_1$ and $R_2$; an image inverting optical member having lens surfaces $R_3$ and $R_4$ and reflecting surfaces $M_1$, $M_2$, $M_3$, and $M_4$; and an eyepiece having lens surfaces $R_5$ and $R_6$. Thus, when the finder optical system is actually disposed in a camera body, the objective lens and the eyepiece, as shown in FIG. 1, are situated in front of and behind the Porto prism of the image inverting optical member, no matter how the arrangement of the optical system is simplified. Hence, the corresponding thickness of the optical system is imperatively needed, and there is a limit to the reduction of the length along the optical axis.

In order to solve such a problem, optical systems, such as those disclosed in Japanese Patent Preliminary Publication Nos. Sho 63-226616 and Hei 1-255825, are available. These optical systems are designed so that the position of an object image formed by an objective lens is located inside an image inverting optical member to thereby intend the reduction of the overall length. Such prior art, however, develops the defect that because an optical member, such as a field frame, is disposed at the imaging position, the image inverting optical member, such as the Porto prism which can be integrally molded originally, must be divided into two, with a resulting increase in the number of parts.

SUMMARY OF THE INVENTION

It is, therefore, an object of the present invention to provide a real image mode finder optical system in which compactness can be realized by a simple arrangement, without increasing the number of parts, the field angle covers a wide range, and the overall length can be reduced.

In order to achieve this object, the real image mode finder optical system according to the present invention includes an objective lens, an image inverting optical member for erecting an object image formed by the objective lens, and an eyepiece for observing the object image. The objective lens has a reflecting surface and satisfies the condition:

$$0.1 < D/f < 0.4 \tag{1}$$

where D is the distance between the exit surface of the objective lens and the entrance surface of the image inverting optical member and f is the focal length of the objective lens. The objective lens is constructed so that the conventional objective lens and the first refleeting surface of the conventional image inverting optical member are integrally configured as a prism.

FIG. 2 shows a state where the finder optical system of the present invention is incorporated in a camera. The finder optical system comprises an objective lens 4 shaped into a prism form, having an entrance surface 1, a reflecting surface 2, and an exit surface 3; an image inverting prism 8 having three reflecting surfaces 5, 6, and 7; and an eyepiece 9. Each of the entrance surface 1 and the exit surface 3 of the objective lens 4, followed by the entrance surface 10 of the image inverting prism 8, is configured as a curved surface with a positive power.

In the finder optical system, an image of an object is formed by the combined refracting power of the objective lens 4 and the entrance surface of the image inverting prism 8, and is observed through the eyepiece 9. Further, the reflecting surface 2 of the objective lens 4 and the three reflecting surfaces of the image inverting prism 8 have the same configuration as those of the Porro prism, and these four reflecting surfaces invert the image to form an erect image.

Apart from the finder optical system, a photographic lens 11 is disposed nearly parallel to the optical axis of the finder optical system. Reference numeral 12 represents film. These components are arranged, together with others, inside a camera body 13.

In this way, the real image mode tinder optical system according to the present invention, as shown in FIG. 2, is compactly incorporated in the camera body, and thus it does away with the corresponding thickness required for the objective lens of the conventional finder optical system such as shown in FIG. 1. The arrangement of the finder optical system can thus be simplified to reduce the overall length.

In the real image mode finder optical system of the present invention, the distance D between the exit surface of the objective lens and the entrance surface of the image inverting optical member needs some degree of space to correct for aberration. For its limit, it is desirable to satisfy Eq. (1). This is because if the value of Eq. (1) exceeds the lower limit, the ability to correct for aberration will decrease at the surface on the image side of the objective lens, and in particular the degradation of astigmatism will be caused, while if the value of Eq. (1) passes the upper limit, a compact arrangement of the entire finder optical system becomes impossible.

Further, it is desirable that the finder optical system of the present invention provides the entrance and exit surfaces of the objective lens with curvatures, satisfying conditions:

$$f/r1 > 0.9 \quad (2)$$

$$f/r2 > -0.7 \quad (3)$$

where $r_1$ and $r_2$ are radii of curvature of surfaces on the objective and image sides of the objective lens, respectively. If the value of each of Eqs. (2) and (3) exceeds the lower limit of f/r1 or the upper limit of f/r2, the refracting power of the objective lens will decline. This makes it difficult to bring about the finder optical system which has a simple arrangement and a wide field angle as in the present invention. Hence, by providing curvatures within the limits of the values satisfying Eqs. (2) and (3), the objective lens can hold a positive power of moderate strength, with a wide field angle.

If, however, the refracting power of the objective lens is extremely high, it is difficult to secure a finder optical system of high performance. Thus, in the above-mentioned finder optical system, if either the entrance or exit surface of the objective lens, or both, are made aspherical, aberrations can be favorably corrected and a finder optical system of high performance can also be realized. Additionally, if the entrance surface of the image inverting optical member is provided with curvature, an entrance pupil can be situated adjacent to the lens system. In this way, the height of a ray through the objective lens can be held low, which situation is effective for compactness of the objective lens.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 4 is a developed view of the optical system in a first embodiment of the present invention;

FIGS. 5A, 5B, and 5C are aberration curve diagrams in the first embodiment;

FIG. 8 is a developed view of the optical system in a third embodiment of the present invention; and FIGS. 9A, 9B, and 9C are aberration curve diagrams in the third embodiment.

DETAILED DESCRIPTION OF THE PREFERRED EMBODIMENTS

Figure 1:
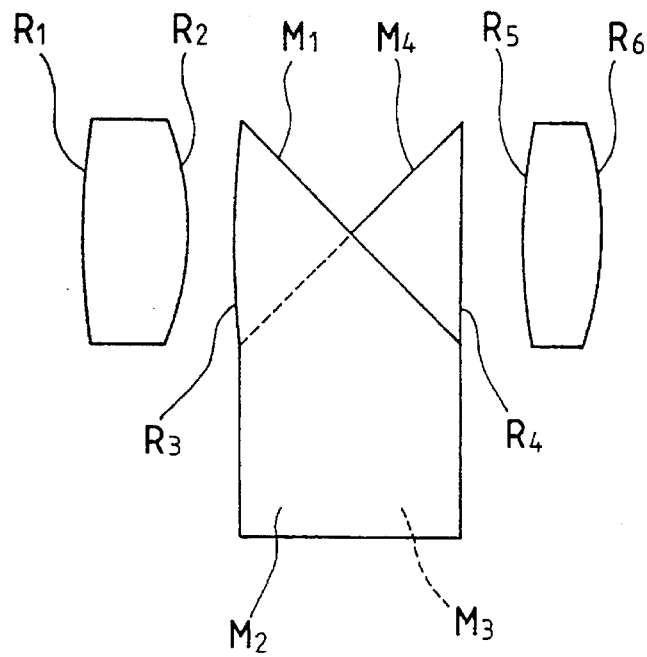
FIG. 1 is a sectional view showing the arrangement of a real image mode finder optical system of prior art.
Figure 3:
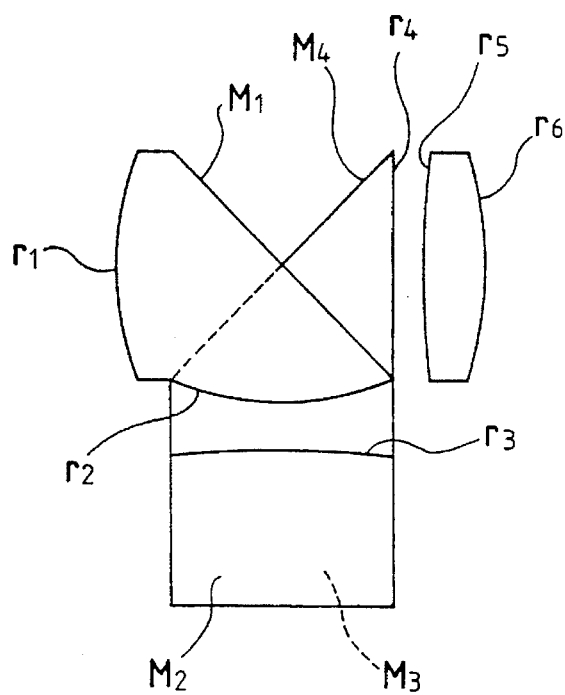
FIG. 3 is a sectional view showing a fundamental arrangement of the optical system of the present invention.
Figure 2:
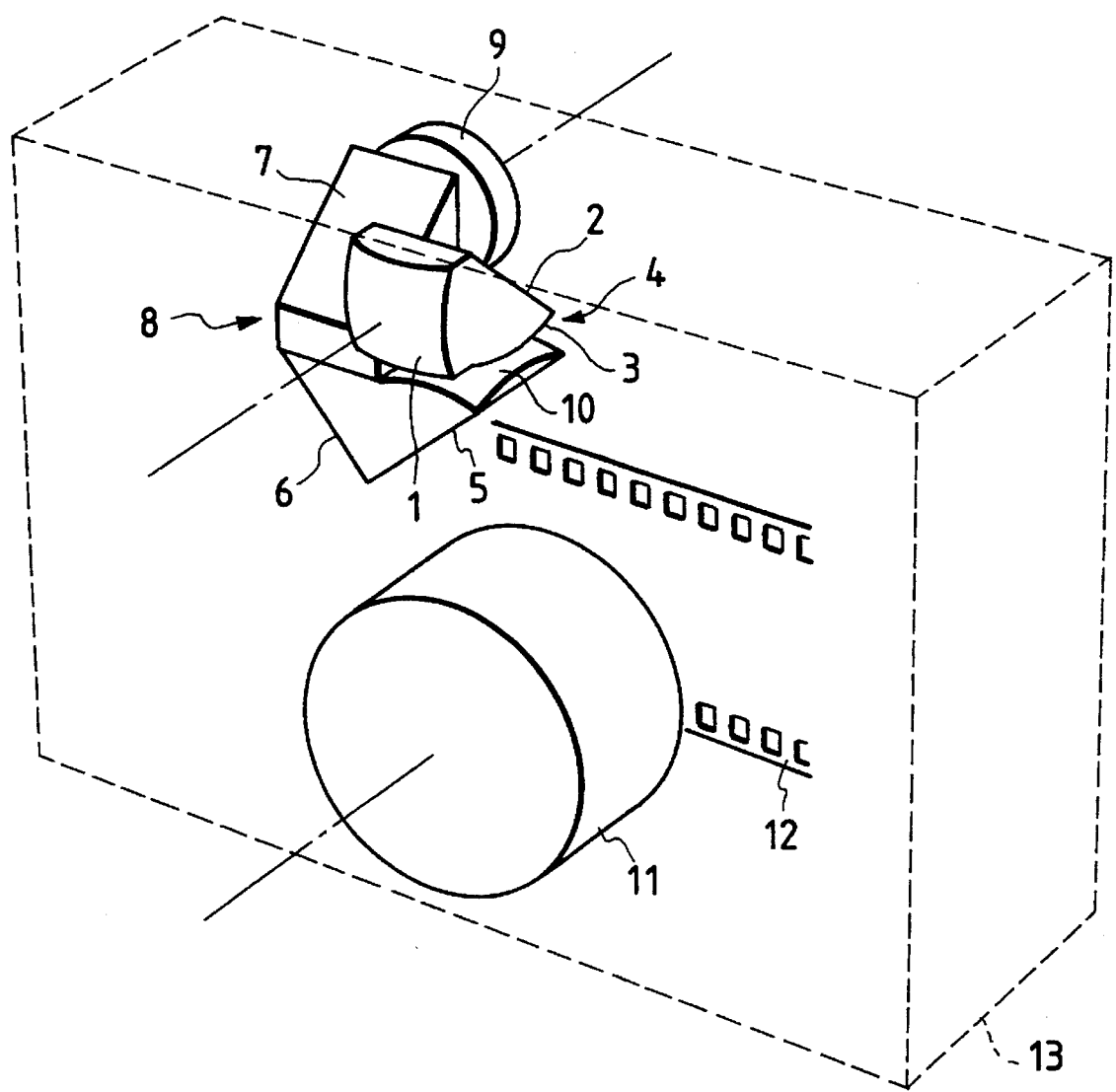
FIG. 2 is a view showing a state where a real image mode finder optical system according to the present invention is incorporated in a camera.
Figure 6:
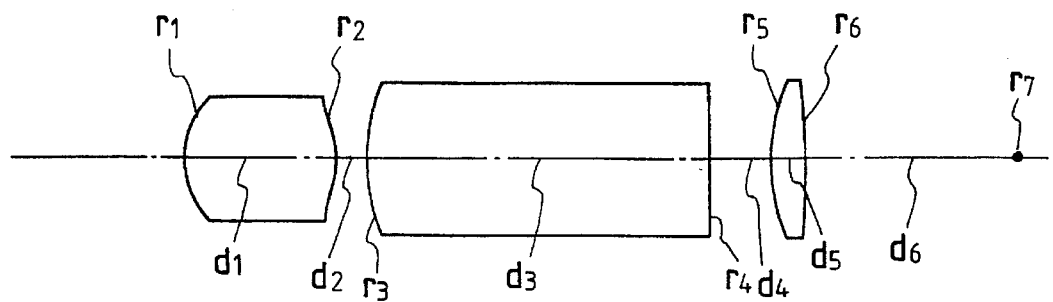
FIG. 6 is a developed view of the optical system in a second embodiment of the present invention.
Figure 7A:
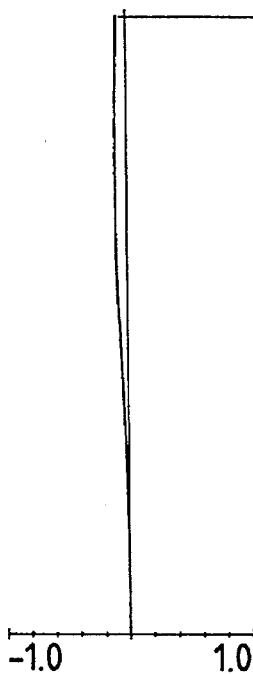
FIGS. 7A, 7B, and 7C are aberration curve diagrams in the second embodiment.
Figure 7B:
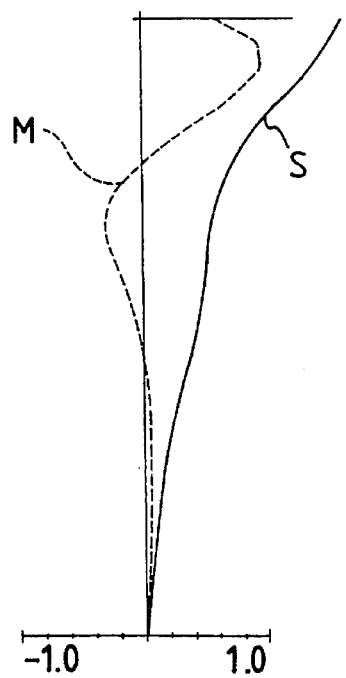
Figure 7C:
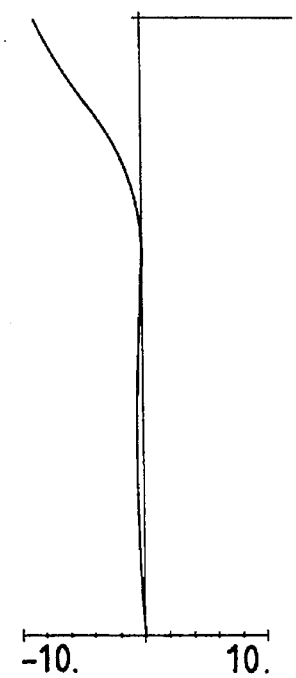

In accordance with the embodiments shown, the present invention will be explained in detail below. FIG. 3 shows the fundamental arrangement of the present invention, and FIG. 4 is a developed view in the first embodiment of the present invention. The optical system of one first embodiment includes an objective lens having a first lens surface r1, a first reflecting surface $M_1$, and a second lens surface $r_2$; an image inverting optical member having a third lens surface $r_3$, a second reflecting surface face $M_2$, a third reflecting surface $M_3$, a fourth reflecting surface $M_4$, and a fourth lens surface $r_4$; and an eyepiece having a fifth lens surface $r_5$ and a sixth lens surface $r_6$. Of these surfaces, the third lens surface $r_3$ constituting the image inverting optical member is provided with curvature to transmit a pupil and assumes the role of a field lens. FIGS. 5A, 5B, and 5C are the aberration curve diagrams of the first embodiment.

The numerical data of the first embodiment are shown below.

---

Finder magnification = 0.4x
Half field angle of incidence $\omega = 30.2°$
$r_1 = 6.1989$ (aspherical)
  $d_1 = 12.4315$   $n_1 = 1.4924$   $v_1 = 57.7$
$r_2 = -4.9467$ (aspherical)
  $d_2 = 2.991$
$r_3 = 21.5324$
  $d_3 = 28.7940$   $n_3 = 1.4924$   $v_3 = 57.7$
$r_4 = \infty$
  $d_4 = 1.4830$
$r_5 = 17.4342$ (aspherical)
  $d_5 = 2.4950$   $n_5 = 1.4924$   $v_5 = 57.7$
$r_6 = -26.5239$
  $d_6 = 15.0000$
$r_7 =$ (pupil)

Aspherical coefficients

First surface

P = 0.076
E = $-0.23077 \times 10^{-2}$, F = $0.36733 \times 10^{-3}$,
G = $-0.30451 \times 10^{-4}$, H = $0.94683 \times 10^{-6}$ Second surface P = 0.9521
E = $0.16652 \times 10^{-2}$, F = $0.14210 \times 10^{-4}$,
G = $-0.11044 \times 10^{-4}$, H = $0.33959 \times 10^{-6}$ Fifth surface P = 3.6453
E = $-0.17402 \times 10^{-3}$, F = $0.21924 \times 10^{-6}$,
G = $-0.10042 \times 10^{-7}$, H = $0.94956 \times 10^{-10}$

---

The values of Eqs. (1), (2), and (3) in the first embodiment are as follows:

D/f=0.338 f/r1=1.428 f/r2=−1.783

FIG. 6 and FIGS. 7A, 73, and 7C are the developed view and aberration curve diagrams of the second embodiment, respectively. The numerical data of this embodiment are shown below.

Finder magnification = 0.36x
Half field angle of incidence ω = 27.4°
$r_1$ = 4.6532 (aspherical)
 $d_1$ = 10.954   $n_1$ = 1.4924   $v_1$ = 57.7
$r_2$ = −5.1387 (aspherical)
 $d_2$ = 2.252
$r_3$ = 14.4746
 $d_3$ = 24.535   $n_3$ = 1.4924   $v_3$ = 57.7
$r_4$ = ∞
 $d_4$ = 4.495
$r_5$ = 12.6655 (aspherical)
 $d_5$ = 2.495   $n_5$ = 1.4924   $v_5$ = 57.7
$r_6$ = −70.549
 $d_6$ = 15.000
$r_7$ = (pupil)

Aspherical coefficients

First surface

P = 0.3235
E = −0.20256 × $10^{-2}$, F = 0.11492 × $10^{-3}$,
G = −0.35607 × $10^{-5}$, H = 0.43666 × $10^{-7}$

Second surface

P = 1.4247
E = 0.12102 × $10^{-2}$, F = 0.12589 × $10^{-2}$,
G = −0.13793 × $10^{-3}$, H = 0.47637 × $10^{-5}$

Fifth surface

P = 3.0260
E = −0.28238 × $10^{-3}$, F = 0.38424 × $10^{-5}$,
G = −0.30426 × $10^{-6}$, H = 0.45719 × $10^{-8}$

The values of Eqs. (1), (2), and (3) in the second embodiment are as follows:

D/f=0.286 f/r1=1.689 f/r2=−1.530

FIG. 8 and FIGS. 9A, 9B, and 9C are the developed view and aberration curve diagrams of the third embodiment, respectively. The numerical data of this embodiment are shown below.

Finder magnification = 0.45x
Half field angle of incidence ω = 28.1°
$r_1$ = 5.4622 (aspherical)
 $d_1$ = 12.446   $n_1$ = 1.4924   $v_1$ = 57.7
$r_2$ = −9.8755 (aspherical)
 $d_2$ = 2.601
$r_3$ = 21.5326
 $d_3$ = 28.500   $n_3$ = 1.4924   $v_3$ = 57.7
$r_4$ = ∞
 $d_4$ = 1.500
$r_5$ = 17.4342 (aspherical)
 $d_5$ = 2.4950   $n_5$ = 1.4924   $v_5$ = 57.7
$r_6$ = −26.5239
 $d_6$ = 15.000
$r_7$ = (pupil)

Aspherical coefficients

First surface

P = 0.2243
E = −0.11644 × $10^{-2}$, F = 0.53422 × $10^{-4}$,
G = −0.11963 × $10^{-5}$, H = 0.99294 × $10^{-8}$

Second surface

P = 1.9306
E = 0.11786 × $10^{-2}$, F = 0.90395 × $10^{-4}$,
G = −0.10352 × $10^{-4}$, H = 0.32060 × $10^{-6}$

Fifth surface

P = 0.9985
E = −0.57527 × $10^{-3}$, F = 0.1924 × $10^{-6}$,
G = −0.10042 × $10^{-7}$, H = 0.94956 × $10^{-10}$

The values of Eqs. (1), (2), and (3) the third embodiment are as follows:

D/f=0.267 f/r1=1.786 f/r2=−0.980

In each embodiment mentioned above, r1, r2, . . . represent radii of curvature of individual lens surfaces; d1, d2, . . . are the thicknesses of individual lenses or spaces therebetween; n1, n3, . . . are the refractive indices of individual lenses; and v1, v3, . . . , represent Abbe's numbers of individual lenses.

Also, the configurations of aspherical surfaces in each embodiment are expressed by the following equation using the aspherical coefficients:

$$X = \frac{CS^2}{1 + \sqrt{1 - PC^2S^2}} + ES^4 + FS^6 + GS^8 + HS^{10}$$

where X represents the coordinates in the direction of the optical axis, S the coordinates in the direction normal to the optical axis, C the curvature (=1/r) at the vertex of the aspherical surface, and P the conic constant.

What is claimed is:

1. A real image mode finder optical system comprising, in order from an object side thereof:

an objective lens;

an image inverting optical member for erecting an object image formed by said objective lens; and an eyepiece for observing said object image;

wherein said objective lens has a reflecting surface and satisfies a condition:

0.1<D/f<0.4 where D is a distance between an exit surface of said objective lens and an entrance surface of said image inverting optical member and f is a focal length of said objective lens.

2. A real image mode finder optical system comprising, in order from an object side thereof:

an objective lens;

an image inverting optical member having a plurality of reflecting surfaces for erecting an image, by reflections caused at said plurality of reflecting surfaces;

an eyepiece disposed after said image inerting optical member;

wherein at least one of the reflecting surfaces of said image inverting optical member is disposed inside said objective lens;

wherein the reflecting surfaces, exclusive of said at least one reflecting surface disposed within said objective lens, are integrally configured as a prism, and disposed after said objective lens; and wherein said objective lens satisfies a condition:

0.1<D/f<0.4 where D is a distance between an exit surface of said objective lens and an entrance surface of said prism and f is a focal length of said objective lens.

3. A real image mode finder optical system according to claim 2, wherein said objective lens comprises a lens having an entrance surface, a reflecting surface, and an exit surface, and satisfies conditions:

$$f/r1 > 0.9$$

$$f/r2 > -0.7$$

where r1 and r2 are radii of curvature of the entrance surface and the exit surface of said lens, respectively.

4. A real image mode finder optical system according to claim 3, wherein the entrance surface of said prism is a curved surface.

5. A real image mode finder optical system according to claim 3, wherein one of the entrance surface and the exit surface of said objective lens is aspherical.

6. A real image mode finder optical system according to claim 3, wherein both the entrance surface and the exit surface of said objective lens are aspherical.

* * * * *